No. 869,443. PATENTED OCT. 29, 1907.
J. G. F. LUND.
SCREW SPANNER.
APPLICATION FILED MAR. 26, 1907.
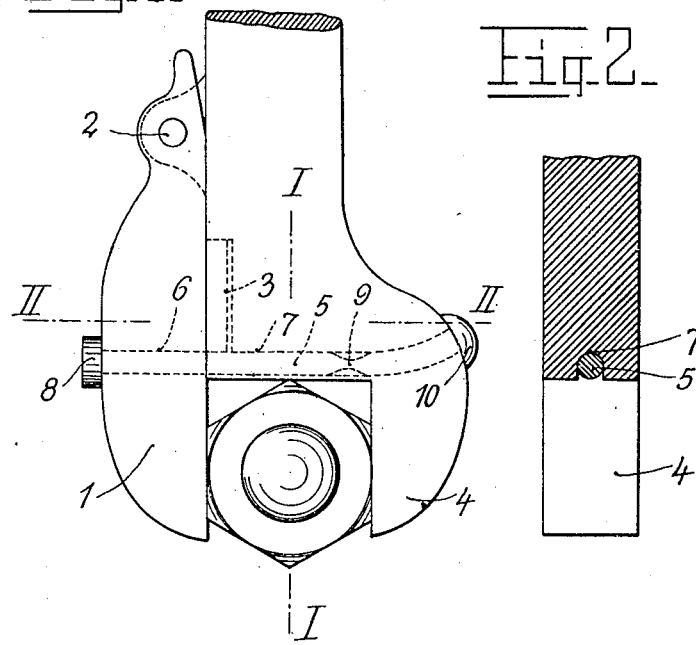
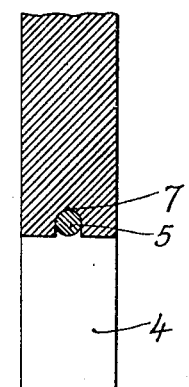
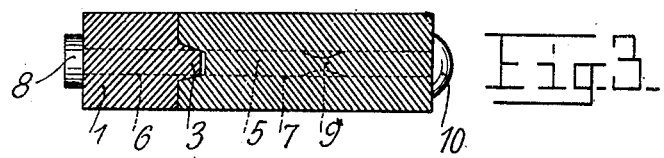
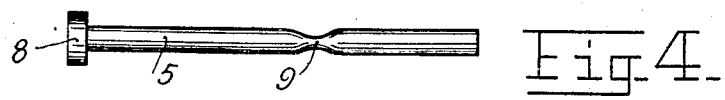
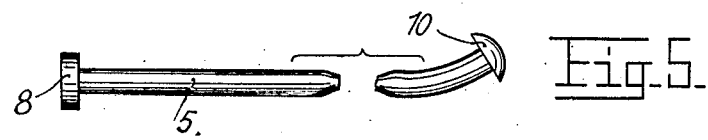
Witnesses: Inventor:
J. G. F. Lund
by
Attorney.

UNITED STATES PATENT OFFICE.

JENS GABRIEL FREDRIK LUND, OF CHRISTIANIA, NORWAY.

SCREW-SPANNER.

No. 869,443.  Specification of Letters Patent.  Patented Oct. 29, 1907.

Application filed March 26, 1907. Serial No. 364,683.

*To all whom it may concern:*

Be it known that I, JENS GABRIEL FREDRIK LUND, of Björn Farmands gade 2, Christiania, in the Kingdom of Norway, have invented certain new and useful Improvements in Screw-Spanners, of which the following is a full, clear, and exact description.

In many cases, especially in the building trades it is desirable to stretch a screw or tie bolt with a definite force, in order that the bolt may be given an initial stress, which lies within certain limits, or in order that the bolt may not be broken. For this purpose no reliable means hitherto have been constructed.

My present invention has for its object to provide a tool in the form of a screw spanner, which is constructed in a special manner so as to be adapted to stretch a screw or tie bolt only up to a predetermined force. This tool gives an absolute guarantee of straining or stretching will not exceed the desired initial stress, and enables a workman without special skill to perform the task.

One construction embodying my invention is illustrated in the accompanying drawing, in which Figure 1 is a side view of the head of a screw spanner; Fig. 2 is a longitudinal section along the line I—I of such Fig. 1; Fig. 3 is a cross section at about the line II—II of Fig. 1; Fig. 4 shows a bolt hereinafter called a "guarantee bolt" before insertion, and Fig. 5 shows such a bolt after it has been broken.

The invention, generally speaking, consists in a spanner the two jaws of which are pivotally connected and are normally held in position for engaging a nut or bolt by means of a piece (such as a small guarantee bolt or the like) of a predetermined strength and weakened or more likely to break than the spanner or jaws thereof. When, therefore, the guarantee bolt is broken as a result of turning the spanner, in engagement with a nut or bolt, it is known that the tie bolt has been stretched with the desired stress.

As illustrated in the drawing one jaw, 1, acts as a lever pivoted on the pin, 2. Said jaw is guided or stayed laterally by a part, such as a short rib, 3, projecting into a groove (see Fig. 3) in the body or main part of the spanner, and provided with jaw 4. The two jaws, which are relatively non-adjustable, are also normally held to closed (or nut-engaging) position by a part, such as the guarantee bolt or small bolt, 5, which is meant to be weaker than the jaws and which passes, through holes, 6 and 7, in both jaws, and which holds the jaws in the desired relation. One end (the outer end) of the hole 7 is curved as shown in dotted lines in Fig. 1. The bolts, 5, before use are straight and have a head 8. The straight part of each bolt is weakened or reduced at the point 9.

The workman, who has to stretch the tie bolts, receives a certain number of guarantee bolts, 5, of the straight form shown in Fig. 4. Before stretching a tie bolt, the workman fits or presses a guarantee bolt, 5, into the holes, 6 and 7, with sufficient force to cause said bolt to be bent to the curve of the hole 7. The projecting part or end of the guarantee bolt is then riveted over as shown at 10. Thereafter the tie bolt is stretched until the guarantee bolt, 5, breaks, for which purpose the reduced part 9 is provided, the pieces of the same (Fig. 5) are taken out and a new guarantee bolt inserted.

It is obvious that after having completed the work, the workman has to deliver as many broken guarantee bolts as the number of tie-bolts stretched. The curved form of the one bolt part, which must fit into the outer end of the hole 7, guarantees that the bolt, 5, have been broken by the use of the spanner.

It will be understood that the guarantee bolt, 5, instead of being held fast by means of a usual rivet head (10) may also be provided with threads in its outer end, and with a nut screwed thereto.

Having now described my invention, what I claim as new and desire to secure by Letters Patent is:

1. A screw spanner having non-adjustable jaws and one of which is movable relatively to the other, and a part of predetermined strength capable of being broken upon stretching a tie-bolt to a predetermined limit by the spanner, and normally securing the jaws in closed position.

2. A screw spanner having non-adjustable jaws and one of which is movable relatively to the other, and an added part having a weakened portion and normally securing the jaws in closed position.

3. A screw spanner having a handle provided with a fixed jaw, a separate jaw pivotally connected with the handle, and one of said jaws provided with a curved bolt-holding opening, and a weakened bolt curved to fit in said opening and normally securing the jaws in closed position.

In testimony whereof I have signed my name to this specification in the presence of two subscribing witnesses.

JENS GABRIEL FREDRIK LUND.

Witnesses:
 AXEL LAHN,
 RICHARD STOKKE.